United States Patent [19]
Pearl

[11] Patent Number: 5,378,265
[45] Date of Patent: Jan. 3, 1995

[54] APPARATUS FOR REMOVING FOREIGN PARTICLES FOR AIR

[76] Inventor: Robert L. Pearl, 27 July Ave., Bayville, N.Y. 11709

[21] Appl. No.: 115,542

[22] Filed: Aug. 31, 1993

[51] Int. Cl.$^6$ .................... B01D 47/06; B01D 47/18
[52] U.S. Cl. ................................ 95/219; 95/196; 95/205; 95/222; 55/227; 55/228; 55/230; 55/238; 55/356
[58] Field of Search ............... 95/195, 196, 202, 205, 95/216–222; 55/227, 228, 230, 237, 238, 257.1, 356

[56] References Cited

U.S. PATENT DOCUMENTS

| | | | |
|---|---|---|---|
| 900,062 | 9/1908 | Ernst | 95/218 X |
| 1,979,630 | 11/1934 | Lea | 55/238 X |
| 2,066,683 | 1/1937 | Grubelic | 55/356 X |
| 2,608,267 | 8/1952 | Ortgies | 55/228 |
| 3,173,771 | 3/1965 | Barrett et al. | 95/219 |
| 3,276,189 | 10/1966 | Sylvan | 55/230 |
| 3,282,032 | 11/1966 | King, Jr. et al. | 55/228 X |
| 3,323,290 | 6/1967 | Stern | 95/219 X |
| 3,348,363 | 10/1967 | King, Jr. et al. | 55/228 X |
| 3,807,145 | 4/1974 | Engalitcheff, Jr. et al. | 55/228 X |
| 3,960,526 | 6/1976 | Andrews | 55/227 |
| 4,145,197 | 3/1979 | Strahsner et al. | 55/230 X |
| 4,152,126 | 5/1979 | Strahsner et al. | 55/238 X |
| 4,193,778 | 3/1980 | Strahsner et al. | 55/238 |
| 4,253,854 | 3/1981 | James | 55/227 |
| 4,543,111 | 9/1985 | Müller et al. | 55/230 |
| 4,810,268 | 3/1989 | Chambers et al. | 95/218 X |
| 5,185,016 | 2/1993 | Carr | 55/230 |

Primary Examiner—Robert Spitzer
Attorney, Agent, or Firm—Collard & Roe

[57] ABSTRACT

Air containing foreign particles is admitted into a cylindrical portable housing at the input end and cleaned air is discharged from the outlet end. A liquid supply has an open bath at the bottom of the housing. A source of liquid is controlled to supply liquid to the bath upon the level of the liquid falling below a predetermined magnitude. A spray sprays liquid from the bath into the housing, whereby foreign particles in the air entering the housing are coated with the liquid. Air entering the housing throws the liquid-coated particles onto a helical vane affixed in the housing. The particles are dispersed by the vane and helical ribbons mounted on the vane. A rotary vane has a plurality of blades mounted for rotation within the helical ribbons, and the blades collect and coalesce liquid mists on their surfaces. Air entering the housing rotates the blades, and the foreign particles are dispersed from such blades and helical ribbons mounted in the housing and extending from the blades of the helical vane onto all surfaces in the housing and into the liquid bath, while clean air is discharged at the outlet end.

17 Claims, 11 Drawing Sheets

APPARATUS FOR REMOVING FOREIGN PARTICLES FOR AIR

BACKGROUND OF THE INVENTION

The present invention relates to an apparatus for removing foreign particles from air. More particularly, the invention relates; to an apparatus for cleaning air in an auto body repair shop and in industrial areas where foreign particles such as; dust, dirt, paint, and the like, are in air.

The repair and refinishing of automobile bodies, for example, produce a variety of particles which become airborne during these processes. Included in these particles are dust, dirt, grindings, paints and primers. Air also includes vapors and fumes from the repairing materials. The particles, vapors and fumes are air contaminants which endanger the lives of people breathing air in or near the shop.

Presently utilized apparatus used to clean dusty air in auto body shops include media filters, or electrostatic particle traps which are usually suspended from the ceiling. This results in the disadvantage of lighter airborne contaminants slowly travelling up to the filter through the breathing space of the people working at ground level, thereby permitting heavier contaminants to remain at ground level, where people are breathing. Another disadvantage is that such a prior art apparatus recirculates shop air, permitting unfilterable vapors and fumes to remain in air being inhaled. Still another disadvantage of such an apparatus is that as the filters and traps accumulate dust, and the like, their air flow rate lowers and diminishes their intake capabilities.

Presently utilized air cleaning apparatus is not designed to accept paint and primer particles, due to the sticky adhesive nature of such particles. This creates a need for additional specialized equipment, such as, for example, sprayed paint exhausting enclosures, or booths, which include either common replaceable dry media filters, or wet wash to capture airborne paint particles. Wet washing is commonly used in high production applications and utilizes large, expensive, stationary booths. Furthermore, neither dry nor wet sprayed paint exhaust systems are suited to continually accept dust and dirt, and are likely to clog if they do.

Known air cleaning apparatus is primarily designed to remove specific particulate from air, whereas specific designs limit the various particles the apparatus may remove from air. More importantly, known air cleaning apparatus functions at specific air flow rates, and if an air cleaning apparatus were to operate at a much higher air flow rate, the ability to keep people in the contaminated area from breathing harmful contaminants would be greatly increased.

Air cleaning apparatus of the prior art is normally stationary, having specific particulate intake capabilities, leaving a manufactured product to revolve in manufacture to a different specific work area for completion. In small business applications this concept makes inefficient use of skilled labor and floor space. Therefore, a combination particulate, portable air cleaning device will enhance limited size businesses with labor savings by increased production from healthier employees and a variable use work area, as well as capital savings due to elimination of multiple equipment and floor space expenditures. The failure of air cleaning apparatus of the prior art to provide all of the aforementioned important services in an affordable, portable combination particulate, operationally cost effective, situation adaptable, high volume unit may be its greatest drawback. This leaves the small business operation, or hobbyist in need of an air cleaning system that is able to provide effective air cleaning in today's variable and non-variable particulate producing work places.

The principal object of the invention is to provide a portable apparatus for removing foreign particles from air.

An object of the invention is to provide apparatus for removing foreign particles from air with efficiency, effectiveness and reliability.

Another object of the invention is to provide an inexpensive apparatus for removing foreign particles from air.

Still another object of the invention is to provide an apparatus for removing foreign particles from air and thereby cleaning large volumes of air at high speed.

Yet another object of the invention is to provide an apparatus for removing foreign particles from air, which apparatus does not permit contaminants to remain in the cleaned area.

Another object of the invention is to provide an apparatus for removing foreign particles from air, which apparatus does not recirculate shop air and thereby prevents vapors and fumes from remaining in air.

Still another object of the invention is to provide an apparatus for removing foreign particles, including paint and paint primer particles, from air.

Yet another object of the invention is to provide an apparatus for removing foreign particles from air, which apparatus will not clog.

Another object of the invention is to provide a wet cleaning apparatus for removing foreign particles from air.

Still another object of the invention is to provide an apparatus for removing foreign particles from air, which apparatus is capable of extended continuous operation.

BRIEF SUMMARY OF THE INVENTION

In accordance with the invention, an apparatus for removing foreign particles from air comprises a housing having spaced opposite inlet and outlet ends. Air containing foreign particles is admitted into the housing at the inlet end and cleaned air is discharged from the housing at the outlet end. A liquid source is provided in the housing. A stationary helical vane is provided in the housing and has a plurality of helical ribbons extending from the vane. A rotary vane having a plurality of blades is mounted for rotation within an area surrounded by the helical ribbons. Spraying means sprays liquid from the liquid source into the housing, whereby foreign particles in air entering the housing at the inlet end are coated with the liquid, the air entering the housing throws the liquid-coated foreign particles onto the helical vane and helical ribbons and are dispersed by the vane and helical ribbons. The air entering the housing rotates the blades of the rotary vane which collect and coalesce liquid mists on the surfaces thereof, and the foreign particles are flung off the blades of the rotary vane and dispersed by the helical ribbons onto all surfaces in the housing and into the liquid source, while clean air is discharged at the outlet end.

The housing has a bottom and an axis and the inlet and outlet ends, the helical ribbons and the rotary vane are coaxial about an axis spaced from the axis of the housing and the liquid source is at the bottom of the housing. The housing is substantially cylindrical and portable. The liquid source is an open bath and the spraying means comprises pressurized nozzle means at the inlet end. A plurality of spaced annular ducts are provided in the housing, spaced from the housing and having annular surfaces with apertures formed therethrough.

Impeller means is included for drawing air through the housing from the inlet end through the outlet end. The liquid source comprises an open reservoir, liquid supply means and liquid level sensing means connected to the liquid supply means for sensing the level of liquid in the reservoir and controlling the liquid supply means to supply liquid to the reservoir upon the level of liquid falling below a predetermined magnitude.

Clamping means is provided for affixing the housing at its inlet end in a substantially sealed manner to an enclosure having air containing foreign particles. Baffle means is provided in the liquid supply for keeping particles in the liquid supply and baffle means is spaced above the liquid supply for collecting particles. A fairing in the housing at the outlet end tapers down from an end farthest from the outlet end.

In accordance with the invention, an apparatus for removing foreign particles from air comprises a substantially cylindrical portable housing disposed substantially horizontally with its axis substantially horizontal. The housing has spaced opposite inlet and outlet ends at the ends of an axis spaced from and parallel to the axis of the housing, and means for admitting air containing foreign particles into the housing at the input end and means for discharging cleaned air from the housing at the outlet end. Clamping means on the housing at the inlet end affixes the housing at its inlet end in a substantially sealed manner to an enclosure having air containing foreign particles. Liquid supply means comprises an open bath at the bottom of the housing, a liquid supply, liquid level sensing means connected to the liquid supply for sensing the level of liquid in the bath, liquid control means controlling the liquid supply to supply liquid to the bath upon the level of the liquid falling below a predetermined magnitude and spray means including pressurized nozzle means at the inlet end for spraying liquid from the liquid supply into the housing, whereby foreign particles in air entering the housing at the inlet end are coated with the liquid. A helical vane is affixed in the housing and has a plurality of helical ribbons extending from the vane and fixedly mounted in said housing, whereby air entering the housing throws the liquid-coated particles onto the helical vane and helical ribbons and are dispersed by the helical vane and ribbons. A rotary vane has a plurality of blades mounted for rotation within an area surrounded by the helical ribbons, whereby the blades collect and coalesce liquid mists, including the liquid-coated foreign particles, on the surfaces thereof and the air entering the housing rotates the blades and the foreign particles are flung off the blades of the rotary vane and the helical ribbons onto all surfaces in the housing and into the liquid bath while clean air is discharged at the outlet end.

A plurality of spaced annular ducts are provided in the housing, substantially coaxial with the housing and spaced from the housing. The ducts have annular surfaces with apertures formed therethrough. Impeller means draws air through the housing from the inlet end through the outlet end. Baffle means in the liquid bath keeps particles in the liquid bath and baffle means spaced above the liquid bath collects particles. A fairing in the housing at the outlet end tapers down from an end farthest from the outlet end.

In accordance with the invention, a method for removing foreign particles from air comprises the steps of spraying liquid into air having foreign particles, whereby the foreign particles are coated with the liquid. The liquid-coated particles are then thrown onto stationary helical surfaces and later thrown off the helical surfaces. Liquid mists, including the liquid-coated foreign particles, are collected and coalesced on rotary surfaces. The rotary surfaces are rotated, whereby the foreign particles are flung off onto a plurality of surfaces.

Air having the foreign particles is drawn into a portable housing and clean air is discharged from the housing after removing the foreign particles therefrom.

BRIEF DESCRIPTION OF THE DRAWINGS

Other objects and features of the present invention will become apparent from the following detailed description considered in connection with the accompanying drawings, which discloses embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

The apparatus of the first embodiment of the invention, shown in FIGS. 1 to 3 and 6, 8 and 9, for removing foreign particles such as, for example, dust, dirt, metal, wood, sand, silicon, fiberglass, plastics, stone, paint, primer, asbestos, brake lining, soot, and the like, from air also removes smoke, vapors, fumes, and the like, from air and is therefore ideally suited for cleaning the air of an auto body shop.

The apparatus of the embodiment of FIGS. 1 to 3 and 6 to 9 comprises a substantially cylindrical portable housing 1 disposed substantially horizontally with an axis 2 spaced from and parallel to the axis of said housing. The housing 1 is thus mounted on wheels 3, 4, 5 and 6, for example, in any known manner. The housing 1 has spaced opposite inlet and outlet ends 7 and 8 at the ends of axis 2, respectively, the inlet end 7 being removable and remountable in a substantially airtight manner. An air inlet 9 is provided in the inlet end 7 for admitting air containing foreign particles into the housing 1. An air outlet 10 is provided in the outlet end 8 for discharging cleaned air from the housing 1.

Figure 1:
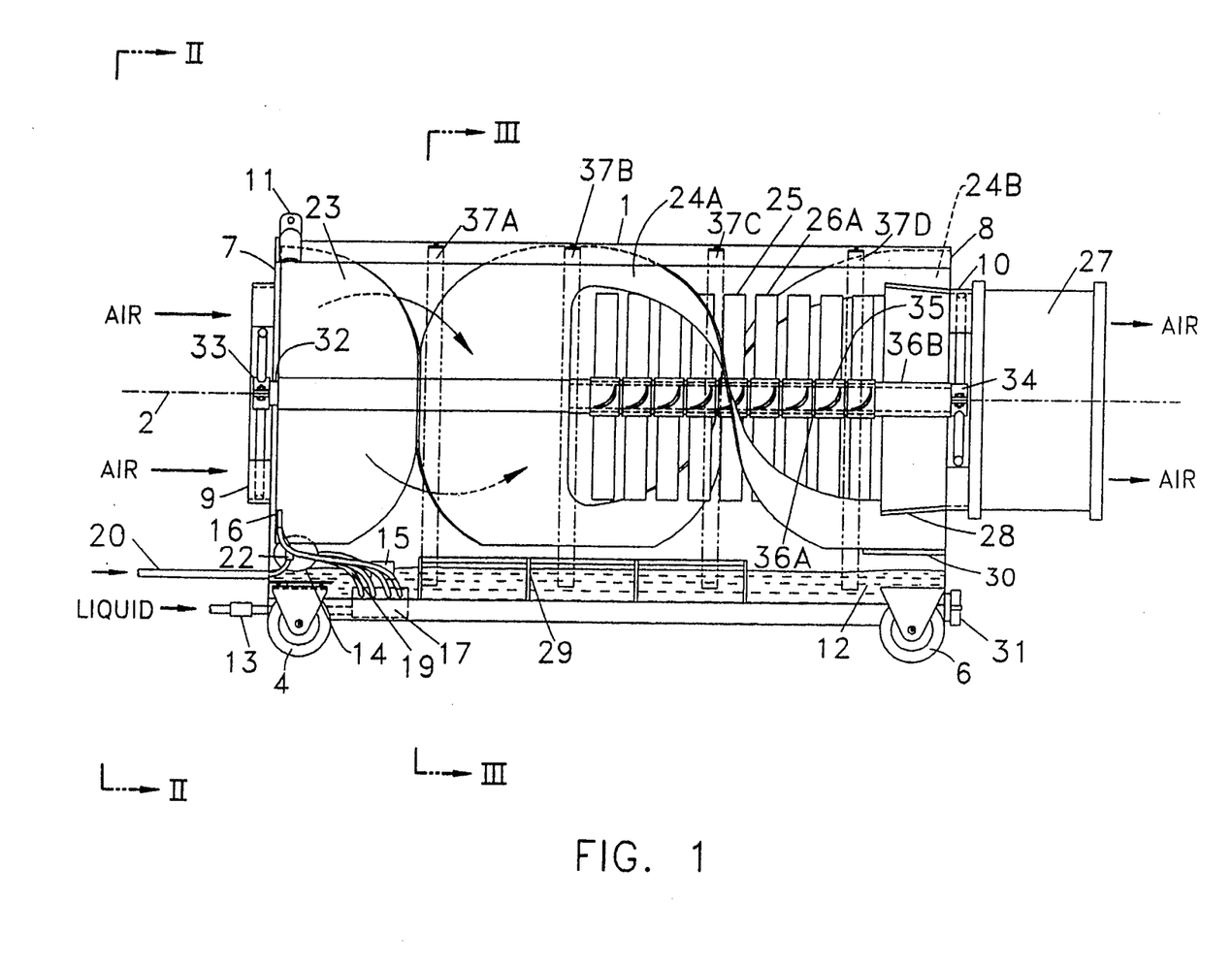
FIG. 1 is a schematic diagram of a first embodiment of the apparatus of the invention for removing foreign particles from air.

A ring clamp 11 of any suitable known type is provided on the housing 1 at its inlet end 7 for affixing said housing at said inlet end to an enclosure (not shown in the FIGS.) having air containing foreign particles in a substantially sealed manner.

A liquid supply comprises an open bath, liquid source, or reservoir 12 at the bottom of the housing 1, as shown in FIGS. 1 and 3 to 5, liquid supply inlet 13, a liquid level sensor 14 of any suitable known means connected to said liquid supply inlet for sensing the level of liquid in said bath. The liquid supply further comprises a liquid control valve 15 for controlling the liquid supply inlet 13 to supply liquid to the bath 12 upon the level of the liquid in said bath falling below a predetermined magnitude and spray means.

Figure 9:
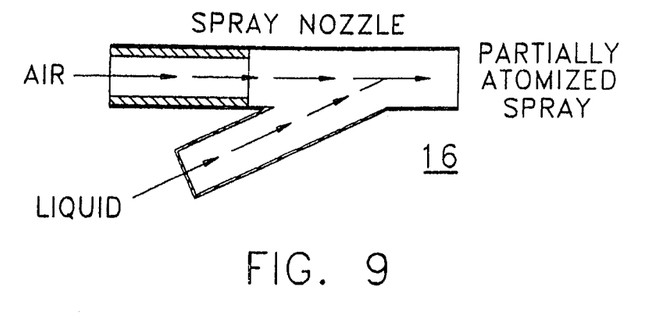
FIG. 9 is a schematic diagram, partly in section, on an enlarged scale, of an embodiment of the nozzle of the apparatus of FIG. 1.

The spray means includes a plurality of pressurized air siphoning liquid splay nozzles 16 at the inlet end 7 in the housing 1 for spraying liquid from the liquid supply inlet, which is first filter by a suitable filter 17, into said housing as a spray 18 (FIG. 2,), whereby foreign particles in air entering said housing at said inlet end are coated with said liquid. As shown in FIGS. 1 and 9, the spray nozzles 16 are positioned so that the sprays cover the air inlet 9 and wet incoming polluted air. The sprays overlap each other so that they fully cover the opening of the air inlet 9. Each of the spray nozzles 16 is connected via a corresponding one of tubes 19 (FIG. 1) to the liquid filter 17. Each of the spray nozzles 16 is also connected to a source of compressed air 20 (FIG. 1) via a corresponding one of tubes 21 (FIG. 2) which includes an in-line air regulator 22 (FIGS. 1 and 2) of any suitable known type. Each in-line air regulator 22 is adjusted to a low air flow so that the spray produced has large droplets.

Figure 6:
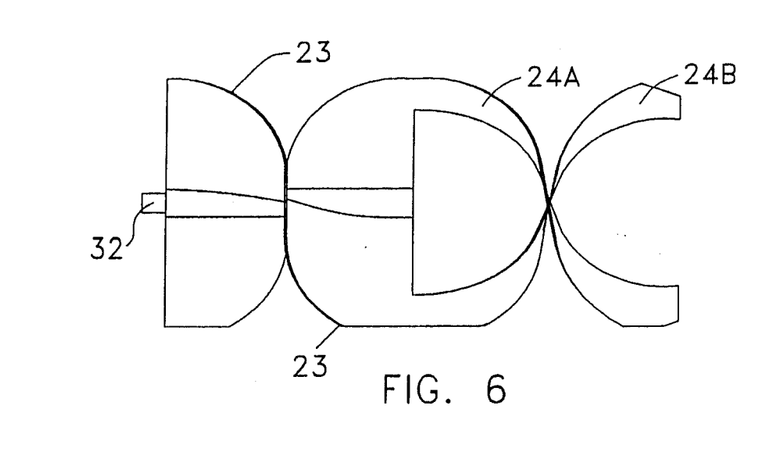
FIG. 6 is a perspective view of part of the helical vane of the apparatus of FIG. 1.
Figure 7:
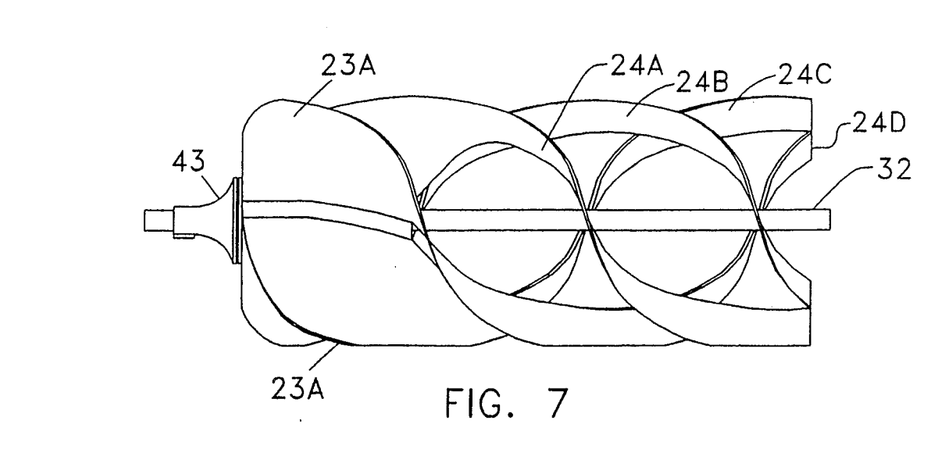
FIG. 7 is a perspective view of part of the helical ribbons of the helical vane of the apparatus of FIG. 1.

A helical vane 23 having two helical blades 23A and 23B is disposed in housing 1. The helical vane 23 has helical ribbons 24A and 24B extending from said vane and fixedly mounted in the housing 1 . Thus, air entering the housing 1 via the air inlet 9 throws the liquid-coated particles onto the helical vane 23 and helical ribbons 24A and 24B and off said helical vane and ribbons. The helical vane 23 is mounted on a rod 32. The helical configuration of the vane 23 completes a 180° twist at the midpoint of the axis 2 and has an overall configuration which provides a low resistance to air flow. The helical ribbons 24A and 24B have the same configuration as the vane 23. Since the ribbons 24A and 24B are narrow relative to the vane 23, said ribbons are helically spaced apart from each other, and intertwined, as shown in FIGS. 6 and 7. Furthermore, the helical ribbons 24A, 24B, 24C and 24D are flattened somewhat at their bottom segments in order to prevent them from being immersed in the liquid bath 12 (FIGS. 1, 4, 6 and 7).

Figure 12:
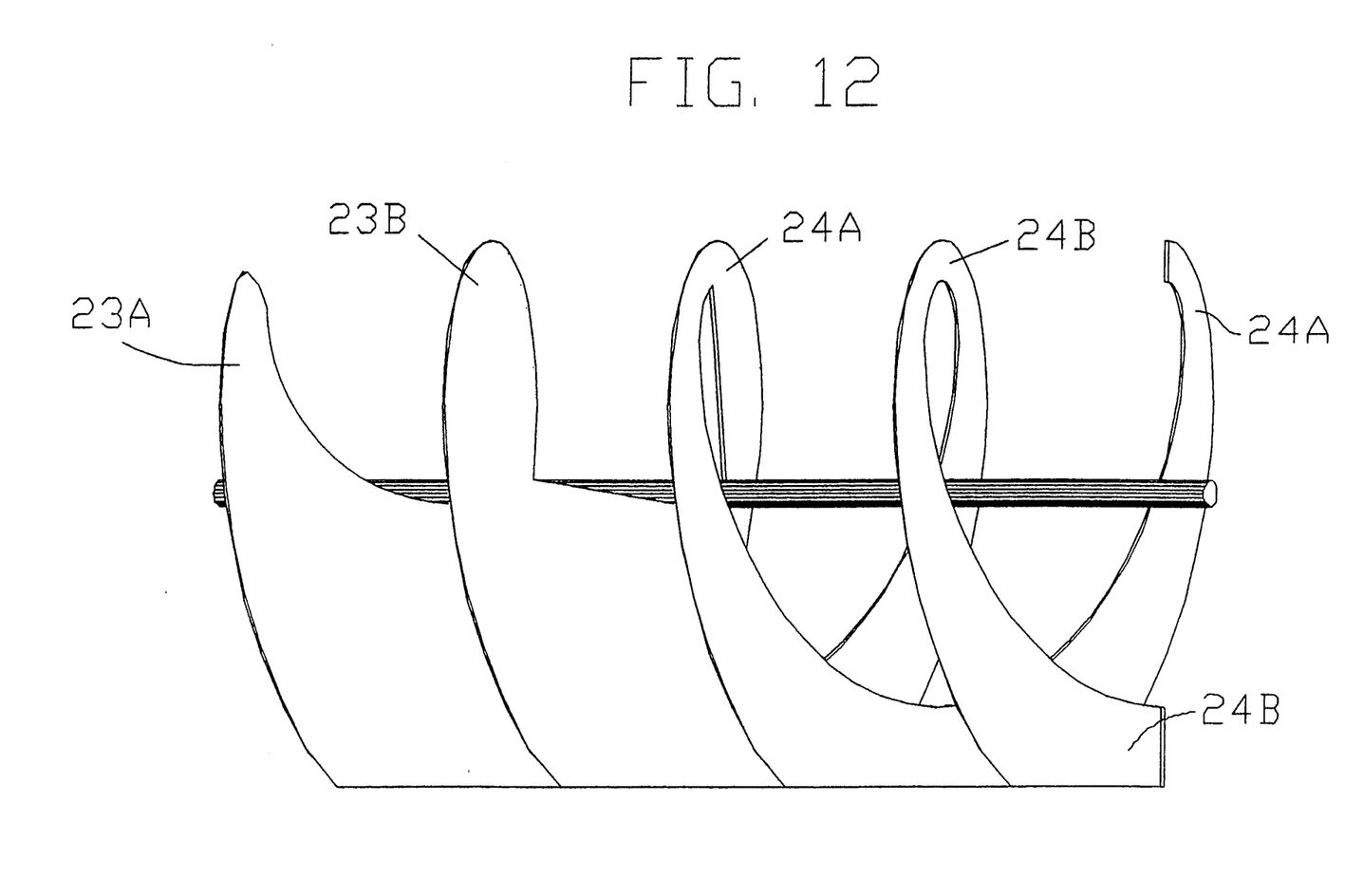
FIG. 12 is a perspective view, on an enlarged scale, of the helical blades arid ribbons of FIG. 1.
Figure 13:
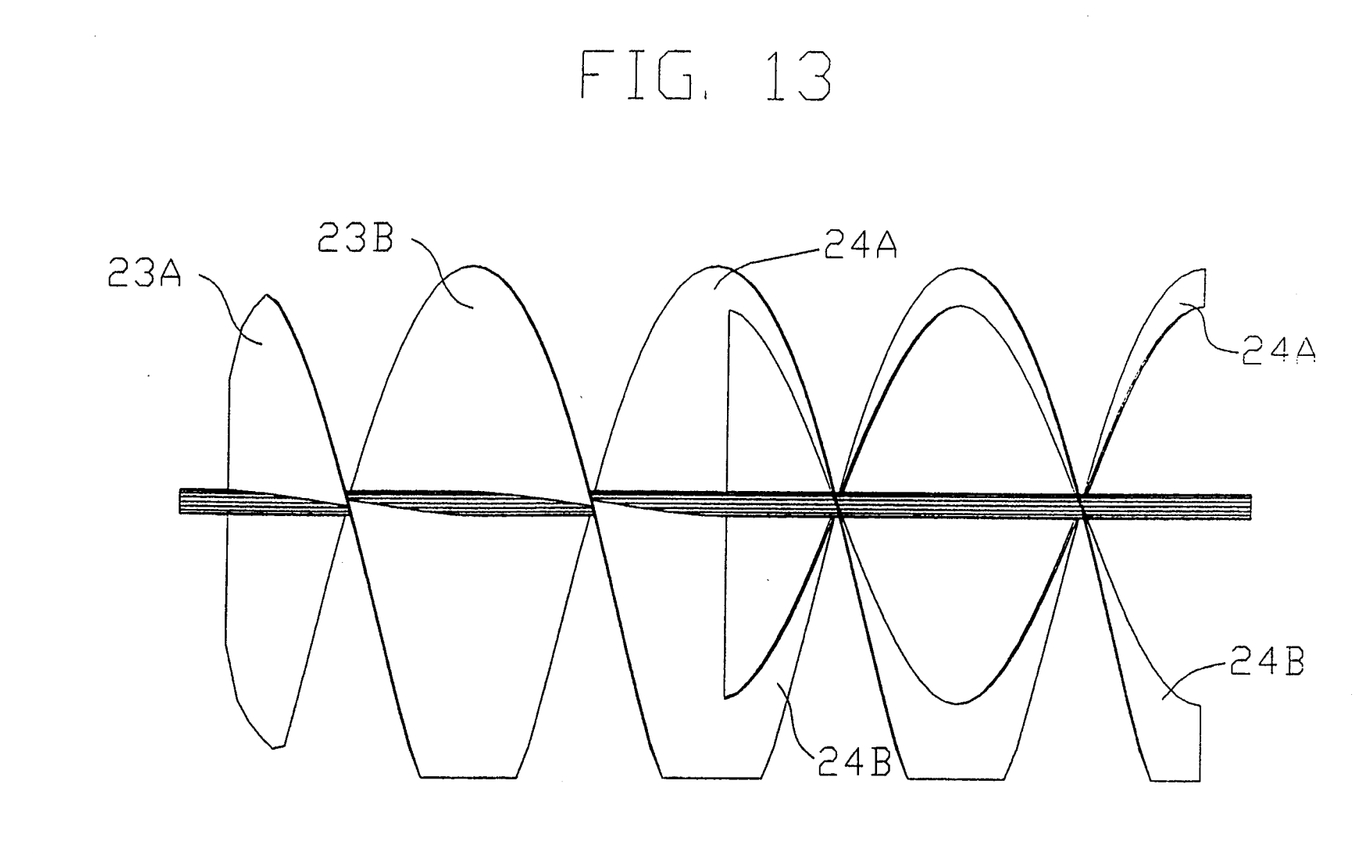
FIG. 13 is another perspective view, on an enlarged scale, of the helical blades and ribbons of FIG. 1.

The helical blades 23A and 23B and the helical ribbons 24A and 24B are clearly illustrated in FIGS. 12 and 13.

Figure 4:
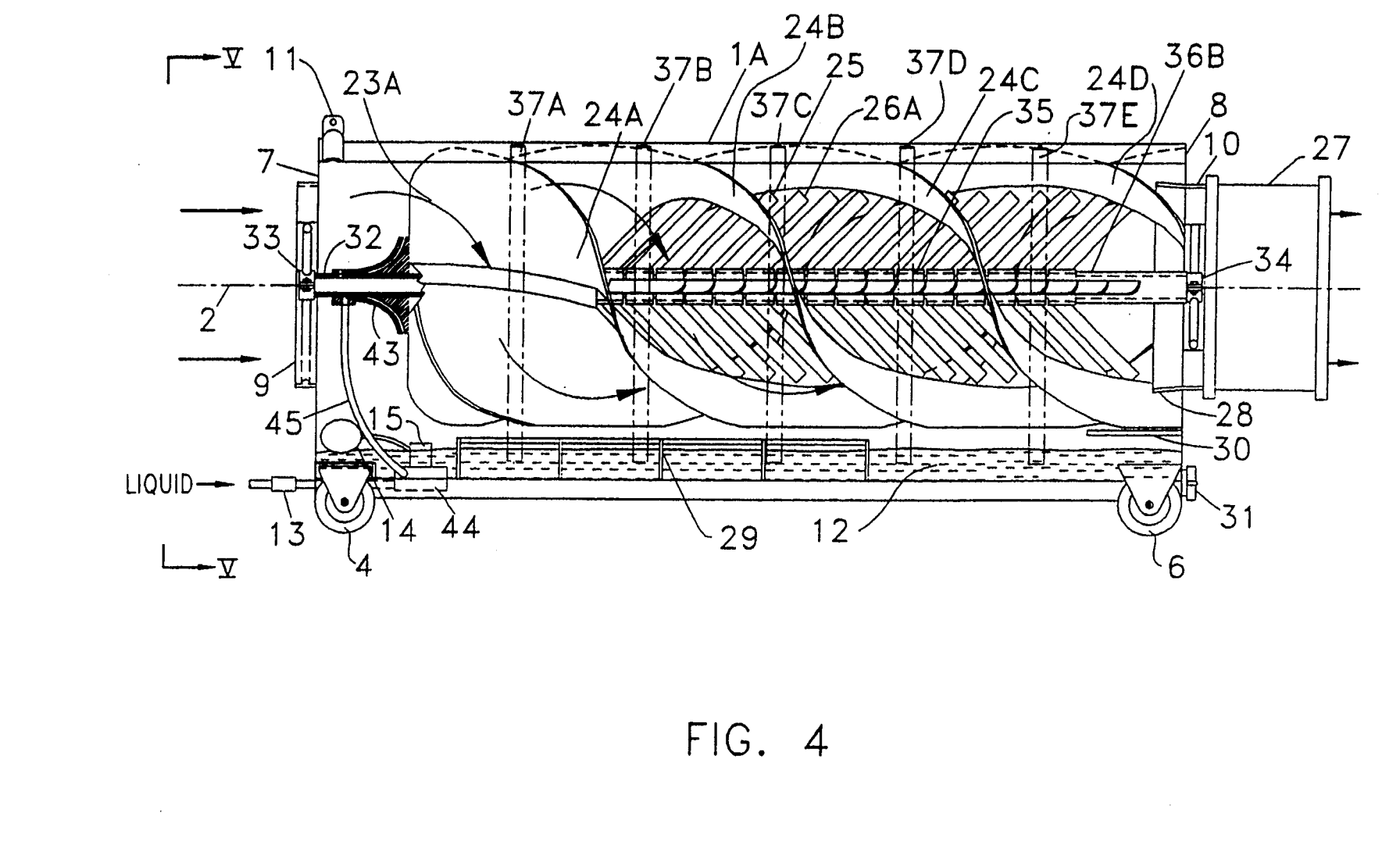
FIG. 4 is a schematic diagram of a second embodiment of the apparatus of the invention for removing foreign particles from air.

A rotary vane 25 has a plurality of blades 26A, 26B, 26C, 26D mounted for rotation within the vane 23 of helical ribbons 24A, 24B, 24C and 24D (FIG. 4). The blades 26A, 26B, 26C and 26D thus collect and coalesce liquid mists on their surfaces and the air entering the housing 1 rotates said blades and the foreign particles are flung off said blades of the rotary vane 25 and the helical ribbons 24A, 24B, 24C and 24D onto all surfaces in said housing and into the liquid bath 12 while clean air is discharged at the air outlet 10.

Figure 14:
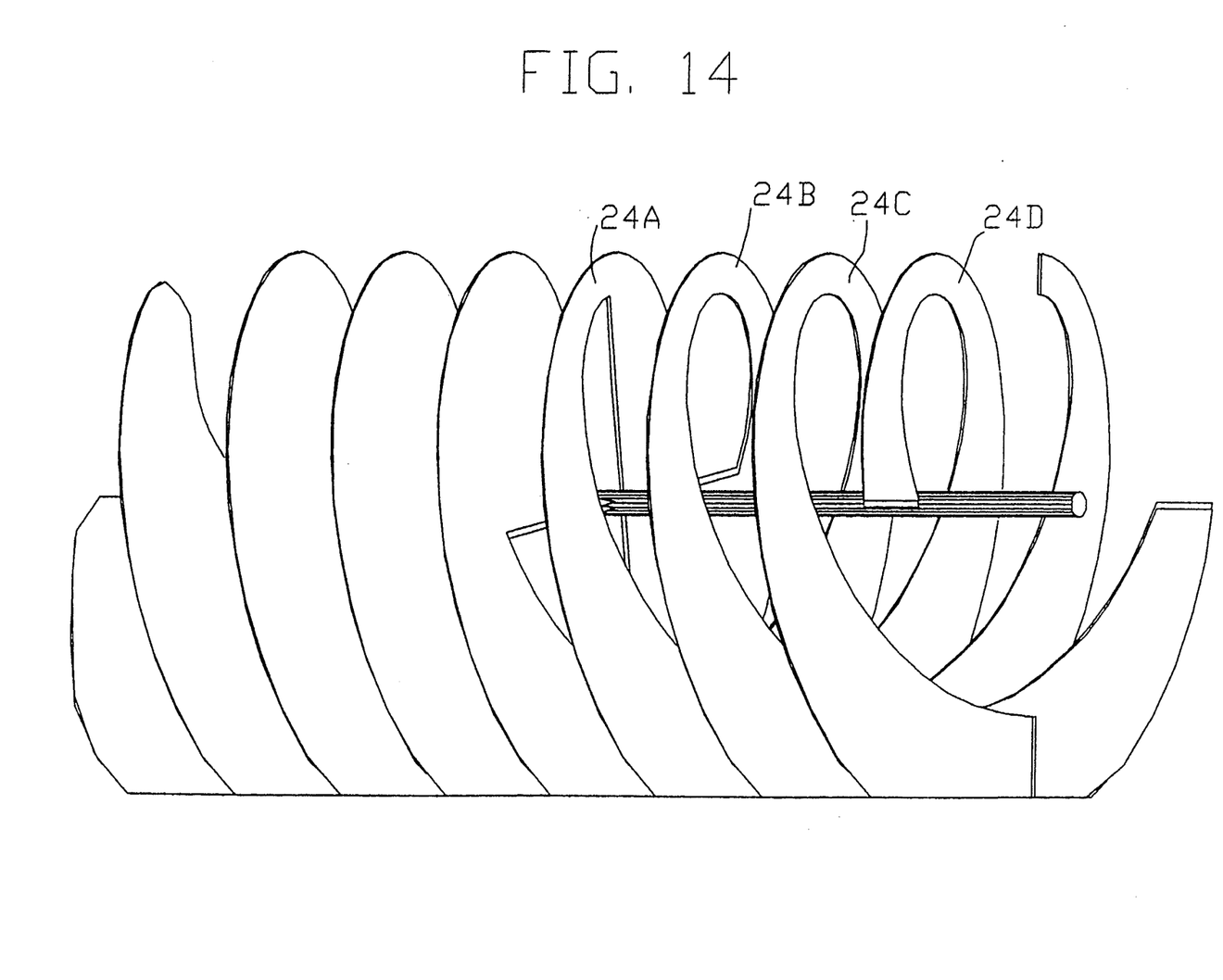
FIG. 14 is a perspective view, on an enlarged scale, of the helical blades and ribbons of FIG. 4.
Figure 15:
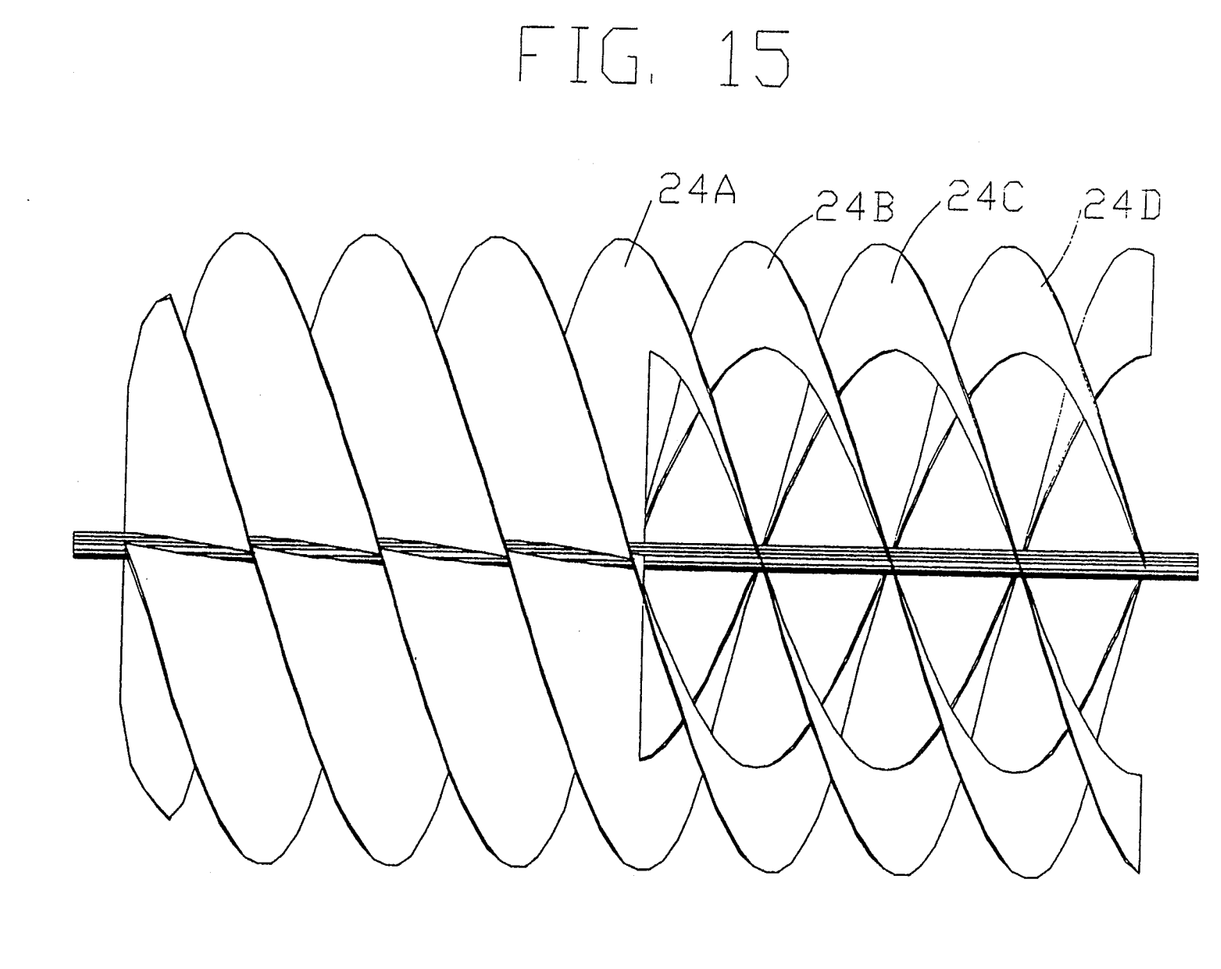
FIG. 15 is another perspective view, on an enlarged scale, of the helical blades and ribbons of FIG. 4.

The helical ribbons 24A, 24B, 24C and 24D are clearly illustrated in PIGS. 14 and 15.

A high air flow fan or impeller 27 of any suitable known type draws air at 5,000 ft$^3$/minute through the housing 1 from the air inlet 9 through the air outlet 10. The fan 27 is coaxially aligned with and in airtight coupling with the air outlet 10. A fairing 28 is mounted in the housing 1 in coaxial alignment with the air outlet 10 and tapers down from an end farthest from said air outlet.

First baffles 29 are disposed in the liquid bath 12 for keeping particles in said liquid bath and second baffles 30 are spaced above said bath for collecting particles. The baffles 29 are mounted upright in the liquid bath 12. The baffles 30 are horizontal and mounted at the outlet end 8 of the housing 1.

A capping drain 31 has a diameter which prevents collected particles from clogging said drain. The rod 32 is coaxially mounted with the axis 2 and extends between the air inlet 9 and the air outlet 10. The rod 32 is supported at its spaced opposite ends by hubs 33 and 34, which are in the air inlet 9 and the air outlet 10, respectively.

Each rotary vane 25 has four vane blades 26A, 26B, 26C, 26D which extend substantially perpendicular to the axis 2 in the embodiment of FIG. 1 and which are in the air stream in the housing 1. Each rotary vane 25 has an axial bearing 35 of any suitable known type such as, for example, Rulon. Spacers 36A, 36B, etc. of varying length, which are waterproof and lubricated, as are the axial bearings, maintain clearance between the rotary vanes 25 and between said rotary vanes, the helical vane 23 and the hubs 3B and 34.

Figure 8:
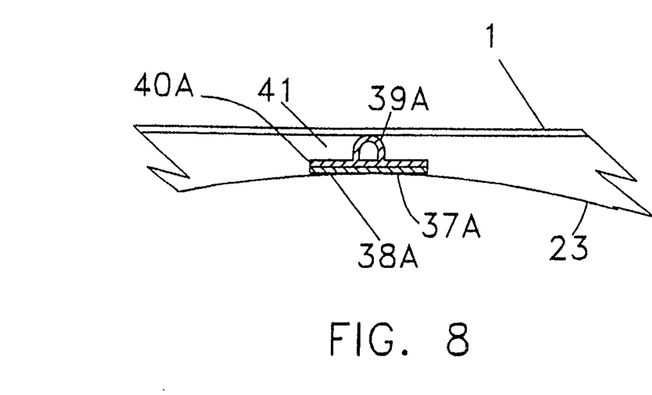
FIG. 8 is a partly cross-sectional view, on an enlarged scale, illustrating that attachment of an annular duct of the apparatus of FIG. 1.

A plurality of spaced annular ducts 37A, 37B, 37C and 37D of any suitable known type are mounted in the housing 1 substantially coaxial with said housing. The ducts 37A to 37D have annular surfaces with apertures formed therethrough. Each of the annular ducts 37A to 37D has an annular surface 38A to 38D, respectively of which FIG. 8 shows the annular surface 38A of the annular duct 37A and 38B to 38D are not shown in the FIGS.. The annular duct 37A positions the farthest edges of the helical ribbons 24 of the helical vane 23. This is accomplished with the assistance of a sealing gasket 39A interspersed between the inside cylindrical surface of the housing 1 and the helical vane 23 (FIG. 8). The leading edge 40A of the annular surface 38, the gasket 39A and the inside cylindrical surface of the housing 1 form a liquid-guiding air shelter 41 (FIG. 8).

Figure 10:
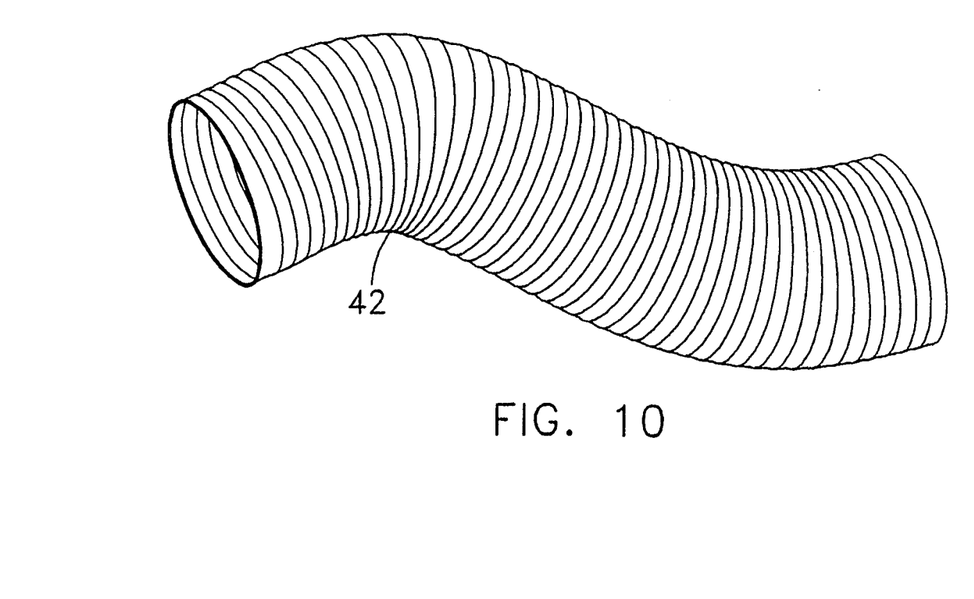
FIG. 10 is a perspective view, on an enlarged scale, of an exhaust tube which may be utilized with the first or second embodiments of the invention.

One end of a collapsible, expandable duct tube 42 of any suitable known type (FIG. 10) may be connected in an airtight manner to the output or exhaust of the fan 27 and the spaced opposite other end of said duct tube may be directed as desired.

Figure 5:
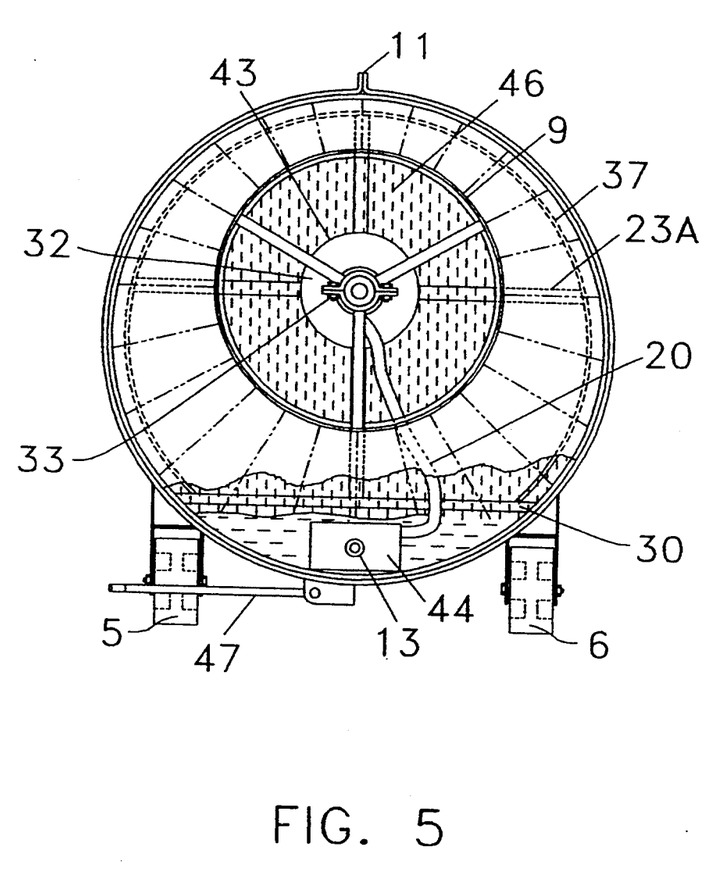
FIG. 5 is an end view, taken along the lines V—V, of FIG. 4.

As shown in FIGS. 4, 5 and 7, the helical vane 23 has helical blades 23A, etc. and four helical ribbons 24A, etc. and twists 90° before the rotary vane 25. This permits additional rotary vanes 25 to be mounted on the rod 32. The blades 26A to 26D of the rotary vane 25 are at an angle different from 90° relative to the axis 2. As shown in FIG. 4, the blades 26A to 26D are at an angle greater than 90° with the axis 2 relative to the air inlet 9. In this configuration, the fan 27 provides an air flow of 10,000 ft$^3$/minute.

This higher air flow permits a different liquid spraying operation. Thus, a nozzle 43 (FIG. 4) is coaxial with the air inlet 9 and is connected to a liquid pump 44 of any suitable known type via a hose, pipe, or tube 45 (FIG. 4). The nozzle 43 produces a full 360° liquid spray 46 (FIG. 5).

Figure 11:
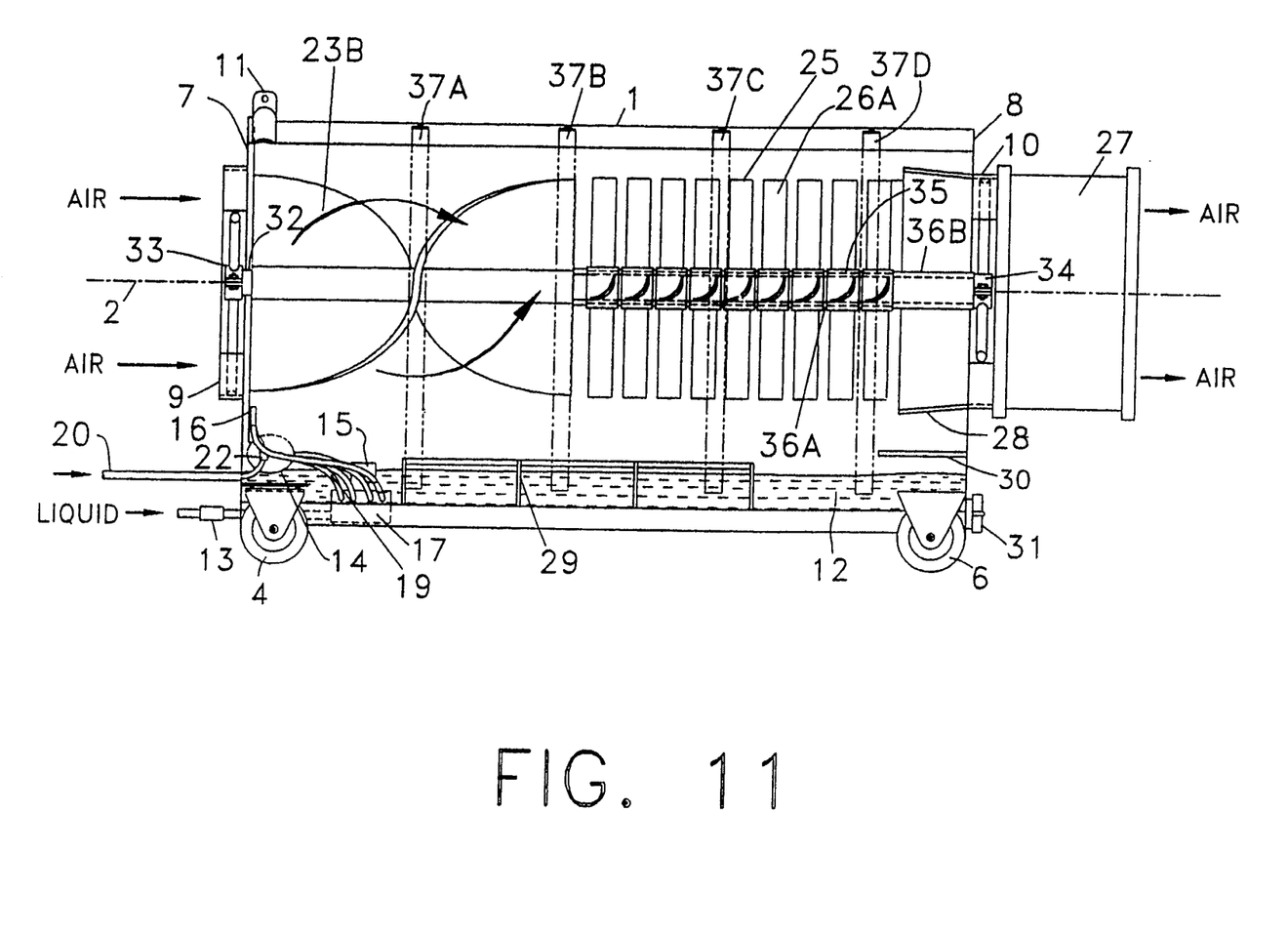
FIG. 11 is a schematic diagram of a third embodiment of the apparatus of the invention for removing foreign particles from air.

The apparatus of the third embodiment of the invention, shown in FIG. 11, is similar to the described first and second embodiments, except that it does not include helical ribbons.

In the method of the invention, liquid, such as water, is sprayed into air having foreign particles, whereby the foreign particles are coated with the liquid. The air is drawn into the portable housing 1. The liquid-coated particles are then thrown onto stationary helical surfaces and thereafter thrown off the helical surfaces. Afterward, liquid mists, including the liquid-coated foreign particles, are collected and coalesced on rotary surfaces. The rotary surfaces are rotated, whereby the foreign particles are flung off onto a plurality of surfaces in the housing. Clean air is discharged from the housing 1 after removal of the foreign particles therefrom.

When the apparatus of the invention is in operation, air containing foreign particles, such as dust, is drawn into the housing 1 via the air inlet 9 due to the action of the fan 27. The air is thoroughly soaked with water in the form of large droplets from the liquid spray 18 (FIG. 2), or a water screen or spray 46 (FIG. 5). These droplets completely encapsulate foreign particles in the air. The airstream in the housing 1 immediately impinges upon the helical blades 23A, etc. and the helical ribbons 24A, etc. This causes the airstream to be directed along a helical or spiral path and the water-encased foreign particles in the air are dispersed from the far edges of the helical ribbons 24A, etc. onto the inside cylindrical surface of the housing 1 and into the liquid bath 12.

Farther downstream, residual mists are formed on the helical ribbons 24A, etc. (FIGS. 6 and 7) and the curvature of said ribbons creates a proportionate additional helical or spiral path for the airstream. The rounded front corners of the helical vane 23 (FIG. 4) permits the water spray 46 with water-enclosed foreign particles in it to contact the inside cylindrical surface of the housing 1A, while causing a proportional outer flow of the airstream. Since the air inlet 9 is small relative to the base input and output ends 7 and 8, respectively, the air flow will slow and expand, thereby discharging liquid with dispersed, water-coated, particles from the airstream.

The rotation of the independent, freely rotating vanes 25 is effected by the high flowing airstream, while resulting in a minimal restriction upon rotation. The rotary vanes 25 catch and dispel residual liquid with particulate mists beyond said rotary vanes. The blades 26A to 26D of the rotary vane effect residual liquid mists which collect and coalesce on the surfaces of said blades. Simultaneously, such liquid mists which collect and coalesce on the surfaces of the rotary vane blades 26A to 26D, are moved by centrifugal force to the tips of said blades from which they are dispersed onto all the inside surfaces of the housing 1, including the cylindrical surface of said housing, or parts of the helical ribbons 24A, etc.

Liquid with liquid-coated particles flows or travels downstream along the inside cylindrical surface of the housing 1 to the annular ducts 37A to 37E. In the ducts, the air and water-coated particles enter between the leading edge 40 and the housing 1 into the liquid guiding air shelter 41, where a lull in the airstream causes them to flow down to the reservoir 12. The fairing 28 functions as an exit of the airstream from the housing 1. The horizontal baffles 30 collect floating particulate in the area above the reservoir 12. The flexible exhaust duct tube 42 (FIG. 10) will give the air cleaning apparatus of the invention mobility while making the air inlet 9 a vacuuming focal point for attracting unclean or dirty air when said tube is coupled to an area of a structure in which said unclean air is originating.

Figure 2:
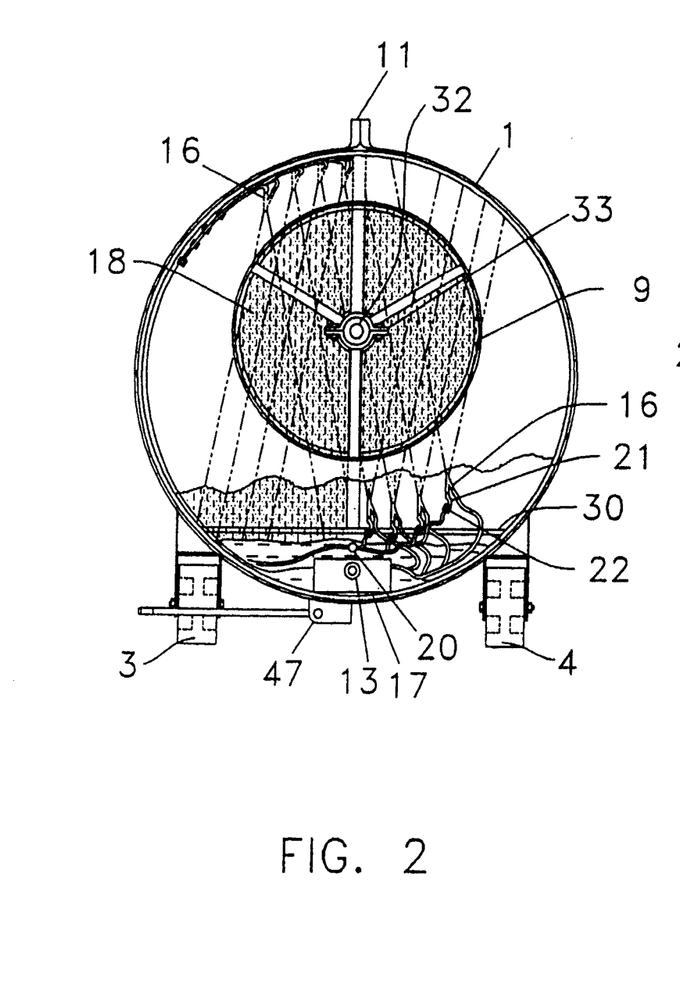
FIG. 2 is an end view, taken along the lines II—II, of FIG. 1.
Figure 3:
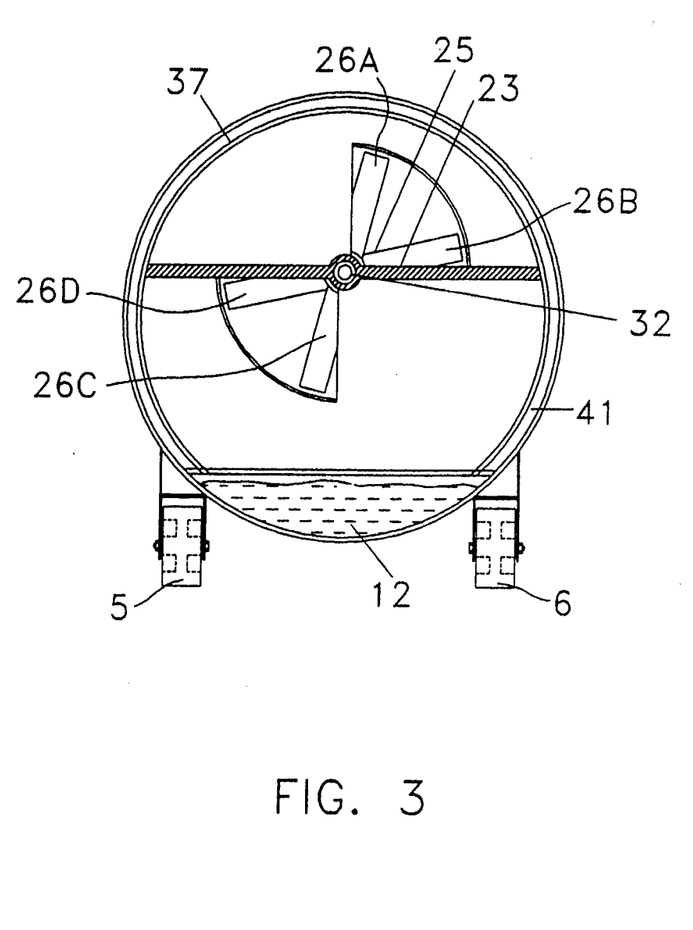
FIG. 3 is a cross-sectional view, taken along the lines III—III, of FIG. 1.

A suggested method of removing and disposing of liquid and particles from the apparatus of the invention includes the following steps. The baffles 29 which maintain the particulate in the bath 12 are removed through the opening of the air inlet 9. The inlet side 7 of the housing 1 is then raised relative to the outlet side 8 and any suitable known device such as, for example, a kickstand 47, is used to maintain this imbalance (FIGS. 2 and 5). The imbalance of the housing 1 causes liquid therein to flow toward the outlet end 8. This causes collected particulate to mass around the capping drain 31, which is opened to allow the liquid and particulate to leave the housing 1.

The reclamation or recycling, or disposal of, the liquid depends upon the type of collected particulate. Thus, if a deactivating agent is used, for example, the liquid may be filtered and reused, whereas the particulate would be disposed of. The apparatus of the invention is made of any suitable known material such as, for example, plastic, composites, metals, metal alloys, or the like, which are durable and corrosion-resistant. If the hubs 33 and 34, helical vane 23, annular ducts 37A to 37E, fairing 28 and horizontal baffle 30 are affixed to the rod 32, along with the rotary vanes 25 and the nozzle 43, all these components may be installed and removed as a unit after the release of clamp 11 and removal of inlet end 7. This would simplify cleaning of the apparatus.

While several embodiments of the present invention have been shown and described, it is to be understood that many changes and modifications may be made thereunto without departing from the spirit and scope of the invention as defined in the appended claims.

What is claimed is:

1. A method for removing foreign particles from air, said method comprising the steps of spraying liquid into air having foreign particles, whereby the foreign particles as coated with the liquid;

throwing the liquid-coated particles onto stationary helical surfaces;

thereafter throwing the liquid-coated particles off said helical surfaces;

collecting and coalescing liquid mists including said liquid-coated foreign particles on rotary surfaces; and rotating said rotary surfaces, whereby said foreign particles are flung off onto a plurality of surfaces.

2. A method as claimed in claim 1, further comprising the steps of placing said helical surfaces and the rotary surfaces in a housing;

drawing air having foreign particles into the housing; and drawing clean air from said housing after removing the foreign particles therefrom.

3. A method as claimed in claim 1, further comprising the steps of placing the helical surfaces and the rotary surfaces in a portable housing; drawing air having foreign particles into the housing; and drawing clean air from said housing after removing the foreign particles therefrom.

4. Apparatus for removing foreign particles from air, comprising a housing having spaced opposite inlet and outlet ends, air containing foreign particles being admitted into said housing at said inlet end and cleaned air being discharged from said housing at said outlet end;

a liquid source in said housing;

a stationary helical vane in said housing having a plurality of helical ribbons extending from said helical vane;

a rotary vane having a plurality of blades mounted for rotation within an area surrounded by said helical ribbons; and spraying means for spraying liquid from said liquid source into said housing, whereby foreign particles in air entering said housing at said inlet end are coated with said liquid, said air entering said housing throws the liquid-coated foreign particles onto said helical vane and said helical ribbons and off said helical vane and helical ribbons, said air entering said housing rotates said blades of said rotary vane which collect and coalesce liquid mists on the surfaces thereof and said foreign particles are flung off said blades of said rotary vane and dispersed by said helical ribbons onto all surfaces in said housing and into said liquid source while clean air is discharged at said outlet end.

5. Apparatus as claimed in claim 4, wherein said housing has a bottom and an axis, said inlet and outlet ends, said helical ribbons and said rotary vane being coaxial about an axis spaced from the axis of said housing and said liquid source is at the bottom of said housing.

6. Apparatus as claimed in claim 4, wherein said housing is substantially cylindrical and portable, said liquid source is an open bath and wherein said spraying means comprises pressurized nozzle means at said inlet end and further comprising a plurality of spaced annular ducts in said housing, spaced from said housing and having annular surfaces with apertures formed therethrough.

7. Apparatus as claimed in claim 4, further comprising impeller means for drawing air through said housing from said inlet end through said outlet end.

8. Apparatus as claimed in claim 4, wherein said liquid source comprises an open reservoir, liquid supply means and liquid level sensing means connected to said liquid supply means for sensing the level of liquid in said reservoir and controlling said liquid supply means to supply liquid to said reservoir upon said level of liquid falling below a predetermined magnitude.

9. Apparatus as claimed in claim 4, further comprising clamping means for affixing said housing at its inlet end in a substantially sealed manner to an enclosure having air containing foreign particles.

10. Apparatus as claimed in claim 4, further comprising baffle means in said liquid supply for keeping particles in said liquid supply and baffle means spaced above said liquid supply for collecting particles.

11. Apparatus as claimed in claim 4, further comprising a fairing in said housing at said outlet end and tapering down from an end farthest from said outlet end.

12. Apparatus for removing foreign particles from air, comprising a substantially cylindrical portable housing disposed substantially horizontally with its axis substantially horizontal, said housing having an inlet end and a spaced opposite at the ends of an axis spaced from and parallel to the axis of said housing and means for admitting air containing foreign particles into said housing at said inlet end and means for discharging cleaned air from said housing at said outlet end;

clamping means on said housing at said inlet end for affixing said housing at its inlet end in a substantially sealed manner to an enclosure having air containing foreign particles;

liquid supply means comprising an open bath at the bottom of said housing, a liquid supply, liquid level sensing means connected to said liquid supply for sensing the level of liquid in said bath, liquid control means for controlling said liquid supply to supply liquid to said bath upon said level of said liquid falling below a predetermined magnitude and spray means including pressurized nozzle means at said inlet end for spraying liquid from said liquid supply into said housing, whereby foreign particles in air entering said housing at said inlet end are coated with said liquid;

a helical vane affixed in said housing and having a plurality of helical ribbons extending from said vane and fixedly mounted in said housing, whereby air entering said housing throws the liquid-coated particles onto said helical vane and helical ribbons and off said helical vane and ribbons;

a rotary vane having a plurality of blades mounted for rotation with an area surrounded by said helical ribbons, whereby said blades collect and coalesce liquid mists, including said liquid-coated foreign particles on the surfaces thereof and said air entering said housing rotates said blades and said foreign particles are flung off said blades of said rotary vane and dispersed by said helical ribbons onto all surfaces in said housing and into said liquid bath while clean air is discharged at said outlet end.

13. Apparatus as claimed in claim 12, further comprising a plurality of spaced annular ducts in said housing, substantially coaxial with said housing and spaced from said housing, said ducts having annular surfaces with apertures formed therethrough.

14. Apparatus as claimed in claim 12, further comprising impeller means for drawing air through said housing from said inlet end through said outlet end.

15. Apparatus as claimed in claim 12, further comprising baffle means in said liquid bath for keeping particles in said liquid bath and baffle means spaced above said liquid bath for collecting particles.

16. Apparatus as claimed in claim 12, further comprising a fairing in said housing at said outlet end, said fairing tapering down from an end farthest from said outlet end.

17. Apparatus for removing foreign particles from air, comprising

- a housing having spaced opposite inlet and outlet ends, air containing foreign particles being admitted into said housing at said inlet end and cleaned air being discharged from said housing at said outlet end;
- a liquid source in said housing;
- a stationary helical vane in said housing;
- a rotary vane having a plurality of blades mounted for rotation within an area adjacent said helical vane; and
- spraying means for spraying liquid from said liquid source into said housing, whereby foreign particles in air entering said housing at said inlet end are coated with said liquid, said air entering said housing throws the liquid-coated foreign particles onto said helical vane and off said helical vane, said air entering said housing rotates said blades of said rotary vane which collect and coalesce liquid mists on the surfaces thereof and said foreign particles are flung off said blades of said rotary vane and dispersed by said helical vane onto all surfaces in said housing and into said liquid source while clean air is discharged at said outlet end.

* * * * *